No. 650,330. Patented May 22, 1900.
J. C. KURTZ.
PIPE COUPLING.
(Application filed Sept. 27, 1899.)
(No Model.)

Witnesses.
Barton Gregg
Carl H. Moe.

J. C. Kurtz,
Inventor
By R. J. McCarty
Attorney

THE NORRIS PETERS CO., PHOTO-LITHO., WASHINGTON, D. C.

UNITED STATES PATENT OFFICE.

JOHN C. KURTZ, OF DAYTON, OHIO.

PIPE-COUPLING.

SPECIFICATION forming part of Letters Patent No. 650,330, dated May 22, 1900.

Application filed September 27, 1899. Serial No. 731,863. (No model.)

*To all whom it may concern:*

Be it known that I, JOHN C. KURTZ, a citizen of the United States, residing at Dayton, in the county of Montgomery and State of Ohio, have invented certain new and useful Improvements in Pipe-Couplings; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to improvements in pipe joints or couplings.

Owing to the general prevalence of electrolysis or the destruction of underground piping by high-voltage currents of electricity the protection and repair of such piping has become one of the problems of modern civilization. This evil manifests itself at different points of the piping, and it becomes necessary to remove parts affected and to replace them with joints or couplings. Such couplings it is essential should both insulate the connection of the pipe and make it fluid-tight.

It is therefore the object of this invention to provide a coupling of this kind, the particular features of which will be fully described, reference being first made to the accompanying drawings, of which—

Figure 1:
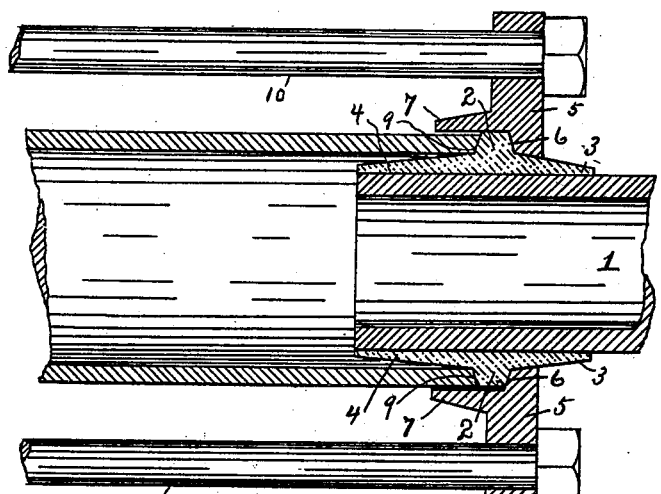
Figure 2:
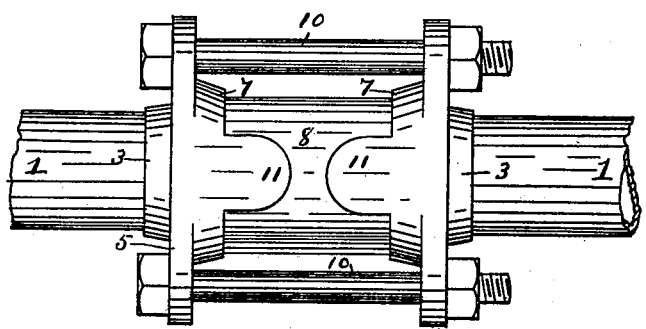
Figure 3:
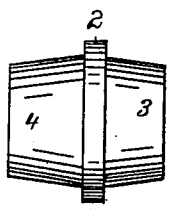
Figure 5:
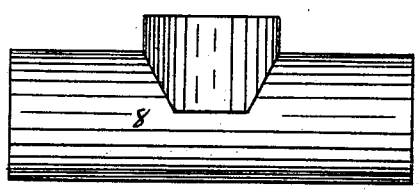
Figure 4:
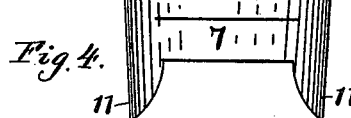
Figure 6:
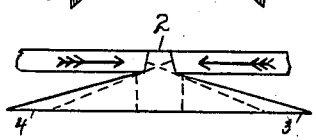

Figure 1 is a sectional elevation of one end of the coupling, showing the character of the joint; Fig. 2, an elevation of the coupling complete; Fig. 3, an elevation of the rubber packing-sleeve; Fig. 4, an elevation of one of the end flanges; Fig. 5, an elevation showing a modification of the coupling-sleeve in the form of a T-fitting; Fig. 6, a diagrammatical view showing the lines of force when the elastic packing-sleeve is compressed.

The elastic packing-sleeve, which surrounds the end of the pipe 1 and by means of which the metallic parts of the coupling are insulated from the pipe and a fluid-tight joint is obtained, comprises a central annular flange or ring 2, which before compression is square-shouldered, as shown in Fig. 3. From this ring portion 2 are extensions or sleeve-like portions 3 and 4, which taper from said ring to the ends on the outer surface, thus providing a thicker portion at the part adjacent to the said ring. This is an important feature of the construction of the packing-sleeve for the reasons hereinafter specified.

5 designates the end flanges, which are recessed to provide a tapering seat 6 to receive the ring 2 of the elastic sleeve. The said flanges are also provided with laterally-extended rims 7, which fit over the end of the coupling-sleeve 8, the ends of said coupling-sleeve being also beveled to provide a surface 9, similar to the seat 6, between which parts the ring 2 is compressed. When in position, as shown in Fig. 1, the sleeve portion 3 of the packing projects out around the pipe 1 and beyond the flange 5, so that the said flange at each end is insulated from the pipe. The inner sleeve portion 4 of said packing in a similar manner projects inwardly around the inclosed end of the piping and insulates the coupling-sleeve 8 therefrom. The end flanges 5 are secured by bolts 10 on opposite sides, which are tightened to compress the packing-sleeve. In the coupling shown only two such bolts are necessary. Projecting from opposite sides of said end flanges and being integral parts thereof are ears 11. When in position, these ears lie close to the coupling-sleeve 8 and serve the functions of additional bolts to the extent that they prevent any giving of the coupling in the direction of said ears.

In place of the coupling-sleeve 8 (shown in Figs. 1 and 2) a T-fitting is used wherever a branch connection is made.

As shown in the diagram Fig. 6, when compression is placed upon the ring 2 of the elastic packing by tightening the bolts the sleeve portions 3 and 4 thereof are extended around the pipe and are made to adhere closely to said pipe. Thus the said packing-sleeve forms a complete insulation between the metallic parts of the coupling and the pipe. This extension of the ends of the packing-sleeve is due to its being beveled on its outer surface from center to ends, as hereinbefore specified. The inclined dotted lines in the diagram Fig. 6 indicate the directions of the lines of force, which extend to the ends of the packing-sleeve. The fluid-tight feature of the coupling is obtained by the inward pressure on the packing-sleeve at the ring portion 2, which is indicated by the parallel or vertical dotted lines.

Having described my invention, I claim—

1. In a coupling for uniting and insulating the ends of pipe-sections, the combination with a coupling-sleeve receiving the ends of the pipe-sections, and end flanges provided with annular seats, and laterally-extended annular rims which overlap the ends of the coupling-sleeve, of an insulating-sleeve having a central enlargement or ring 2 around its outer surface from which are extended sleeve portions 3 and 4, the ring or enlargement 2 being inclosed between the end of the coupling-sleeve and an end flange, and the sleeve portions 3 and 4 inclosing an end of a pipe, as herein shown and described.

2. In a coupling for uniting and insulating the ends of pipe-sections, the combination of a coupling-sleeve, and end flanges having annular seats in one side thereof, and laterally-projecting rims which overlap the ends of the coupling-sleeve, elastic packing-sleeves inclosing the ends of the pipe-sections and projecting beyond the outer sides of the end flanges, the said elastic sleeves having outer peripheral rings that are inclosed between the seats in the end flanges and the ends of the coupling-sleeve and which receive the pressure due to the tightening of said end flanges and the coupling-sleeve, substantially as described.

3. In a pipe-coupling, the combination with a coupling-sleeve and an end flange having a beveled seat with laterally-extended rim which incloses the end of the coupling-sleeve, and ears extending from said rim on each side, of a packing-sleeve having an outer peripheral ring inclosed between said seat and the end of the coupling-sleeve, the said packing-ring inclosing the end of the pipe that projects into the coupling-sleeve, and projecting beyond the end flange on the opposite side so that the end of the pipe is insulated from the coupling-sleeve and said flange, substantially as described.

4. In a pipe-coupling, the combination with a coupling-sleeve, of end flanges with inwardly-extended annular rims which overlap the ends of said sleeve and ears extending from said rims at opposite points of said flanges, and means for tightening said flanges on the ends of the coupling-sleeve, substantially as described.

In testimony whereof I affix my signature in presence of two witnesses.

JOHN C. KURTZ.

Witnesses:
R. J. McCARTY,
CARL H. NOE.